United States Patent
Tu

(10) Patent No.: US 11,715,091 B2
(45) Date of Patent: Aug. 1, 2023

(54) DYNAMIC PAYMENT DEVICE ASSIGNMENTS USING A CLOUD-BASED TRANSACTION SYSTEM

(71) Applicant: Aldelo, LP, Pleasanton, CA (US)

(72) Inventor: Harry Tu, Pleasanton, CA (US)

(73) Assignee: Aldelo, LP, Pleasanton, CA (US)

( * ) Notice: Subject to any disclaimer, the term of this patent is extended or adjusted under 35 U.S.C. 154(b) by 0 days.

(21) Appl. No.: 17/132,781

(22) Filed: Dec. 23, 2020

(65) Prior Publication Data
US 2022/0198434 A1    Jun. 23, 2022

(51) Int. Cl.
*G06Q 20/32* (2012.01)
*G06Q 20/34* (2012.01)

(52) U.S. Cl.
CPC ..... *G06Q 20/3276* (2013.01); *G06Q 20/3224* (2013.01); *G06Q 20/352* (2013.01)

(58) Field of Classification Search
None
See application file for complete search history.

(56) References Cited

U.S. PATENT DOCUMENTS

| 9,117,231 | B2 | 8/2015 | Rodgers et al. | |
| 2018/0232710 | A1* | 8/2018 | Chiarella | G06Q 20/32 |
| 2021/0406852 | A1* | 12/2021 | Carey | H04W 4/023 |
| 2022/0067698 | A1* | 3/2022 | Griffin | G06Q 20/3276 |

FOREIGN PATENT DOCUMENTS

| CN | 103606117 | 2/2014 |
| CN | 103927623 | 7/2014 |
| CN | 104881824 | 9/2015 |
| KR | 20120128743 | 11/2012 |
| KR | 20130005090 | 1/2013 |
| KR | 20150003118 | 8/2015 |
| KR | 101711163 | 3/2017 |

OTHER PUBLICATIONS

Patentability Search Report prepared by Epsilon Patent Searching, Inc., dated May 20, 2020, 3 pages.

* cited by examiner

*Primary Examiner* — Namrata Boveja
*Assistant Examiner* — Amit Patel
(74) *Attorney, Agent, or Firm* — Fish & Richardson P.C.

(57) ABSTRACT

The present disclosure involves solutions for dynamically connecting a customer-owned mobile device, a cloud-based service, and one or more particular physical payment devices located at an entity. In one example, as executed at a cloud-based payment service, a unique identifier associated with a location of a mobile device of a customer is received. An entity and a first location within the entity is determined based on the unique identifier, and a particular payment device at the entity is determined. The cloud service transmits, to the particular payment device, information to be used by the particular payment device to perform the payment transaction. A second signal is transmitted to the mobile device of the customer, and includes an indication of the particular payment device at which the payment transaction is to be completed. The payment transaction can then be completed at the particular payment device.

20 Claims, 5 Drawing Sheets

DYNAMIC PAYMENT DEVICE ASSIGNMENTS USING A CLOUD-BASED TRANSACTION SYSTEM

TECHNICAL FIELD

This specification generally relates to methods and systems for providing dynamic payment device connections between a customer-owned mobile device, a cloud-based service, and one or more particular physical payment devices located at an entity, business, or organization. In particular, users and customers can dynamically connect to one of a plurality of payment devices in different locations within a business through one or more manners, associate their ongoing or current transaction with a particular location, and have the transaction directed to a corresponding or nearby payment device.

BACKGROUND

Current payment solutions and methods generally require store and restaurant owners to provide single points of sale throughout their establishment, and provide associates and employees to facilitate payment at the particular locations within the location. In doing so, customers are typically provided with a single location or area in which a transaction can be completed. Still further, because of the bottleneck created by the single location, additional customer interactions and traffic may result in additional potential contagion vectors, such as for COVID-19, seasonal flus, and other contagious illnesses.

SUMMARY

The present disclosure involves systems, software, and computer implemented methods for providing dynamic payment device connections between a customer-owned mobile device, a cloud-based service, and one or more particular physical payment devices located at an entity. A first example method includes obtaining, at a cloud-based payment service, a unique identifier associated with a location of a mobile device of a customer, the identifier associated with a request to perform a payment transaction. The cloud-based payment service determines an entity and a first location within the entity associated with the unique identifier and then determines, from a plurality of payment devices at the entity, a particular payment device at which the payment transaction is to be completed. In response to determining the particular payment device, information associated with the payment transaction is transmitted, via a first signal, to the particular payment device, where the transmitted information to the particular payment device is used by the particular payment device to perform the payment transaction with the customer. A second signal is transmitted from the cloud-based payment service to the mobile device of the customer, and includes an indication of the particular payment device at which the payment transaction is to be completed. Information associated with the completion of the payment transaction can then be received from the particular payment device.

Implementations can optionally include one or more of the following features.

In some instances, the unique identifier associated with the location of the mobile device of the customer comprises a unique identifier identifying a particular location within the entity, wherein the entity is associated with the plurality of payment devices.

In some of those instances, the unique identifier associated with the location of the mobile device of the customer is embedded in a visually encoded image provided at the entity, wherein the visually encoded image is scanned by a camera of the mobile device of the customer. In some of those instances, the visually encoded image comprises a quick response (QR) code, wherein the QR code embeds the unique identifier and one of a uniform resource locator (URL) for a web resource associated with the cloud-based payment service or a uniform resource identifier (URI) for a mobile application associated with the cloud-based payment service.

Alternatively, in some instances, the unique identifier associated with the location of the mobile device of the customer is embedded in a wireless signal transmitted at the entity, wherein the wireless signal is captured by the wireless capabilities of the mobile device. In those instances, the wireless signal embeds the unique identifier and one of a uniform resource locator (URL) for a web resource associated with the cloud-based payment service or a uniform resource identifier (URI) for a mobile application associated with the cloud-based payment service.

In some instances, the operations further include, in response to determining the entity and the first location within the entity associated with the unique identifier, performing a fraud verification operation to confirm that the current location of the mobile device of the customer corresponds to the first location within the entity. In some instances, the fraud verification operation comprises sending, by the cloud-based payment service and to the mobile device of the customer, a request for information identifying a current location of the mobile device of the customer; receiving, from the mobile device of the customer and by the cloud-based payment service, a response including an identified current location of the mobile device of the customer; and comparing the identified current location of the mobile device of the customer with the first location within the entity to determine whether the identified current location of the mobile device of the customer is within a threshold distance from the first location within the entity. In response to the fraud verification operation determining that the identified current location of the mobile device of the customer is not within a threshold distance from the first location within the entity, the request to perform the payment transaction is rejected.

In some instances, each of the plurality of the payment devices at the entity comprise payment devices capable to perform EMV chip, contactless, or swipe-based transactions.

In some instances, the identifier associated with a request to perform a payment transaction received from the mobile device of the customer is associated with an existing transaction performed via a web-based ordering system, where the payment transaction is to complete the existing transaction.

Similar operations and processes may be performed in a non-transitory computer-readable medium storing instructions which, when executed, cause at least one processor to perform the operations. Additionally, similar operations can be associated with or provided as computer-implemented software embodied on tangible, non-transitory media that processes and transforms the respective data; some or all of the aspects may be computer-implemented methods or further included in respective systems or other devices for performing this described functionality. The details of these and other aspects and embodiments of the present disclosure are set forth in the accompanying drawings and the descrip-

DETAILED DESCRIPTION

Figure 1:
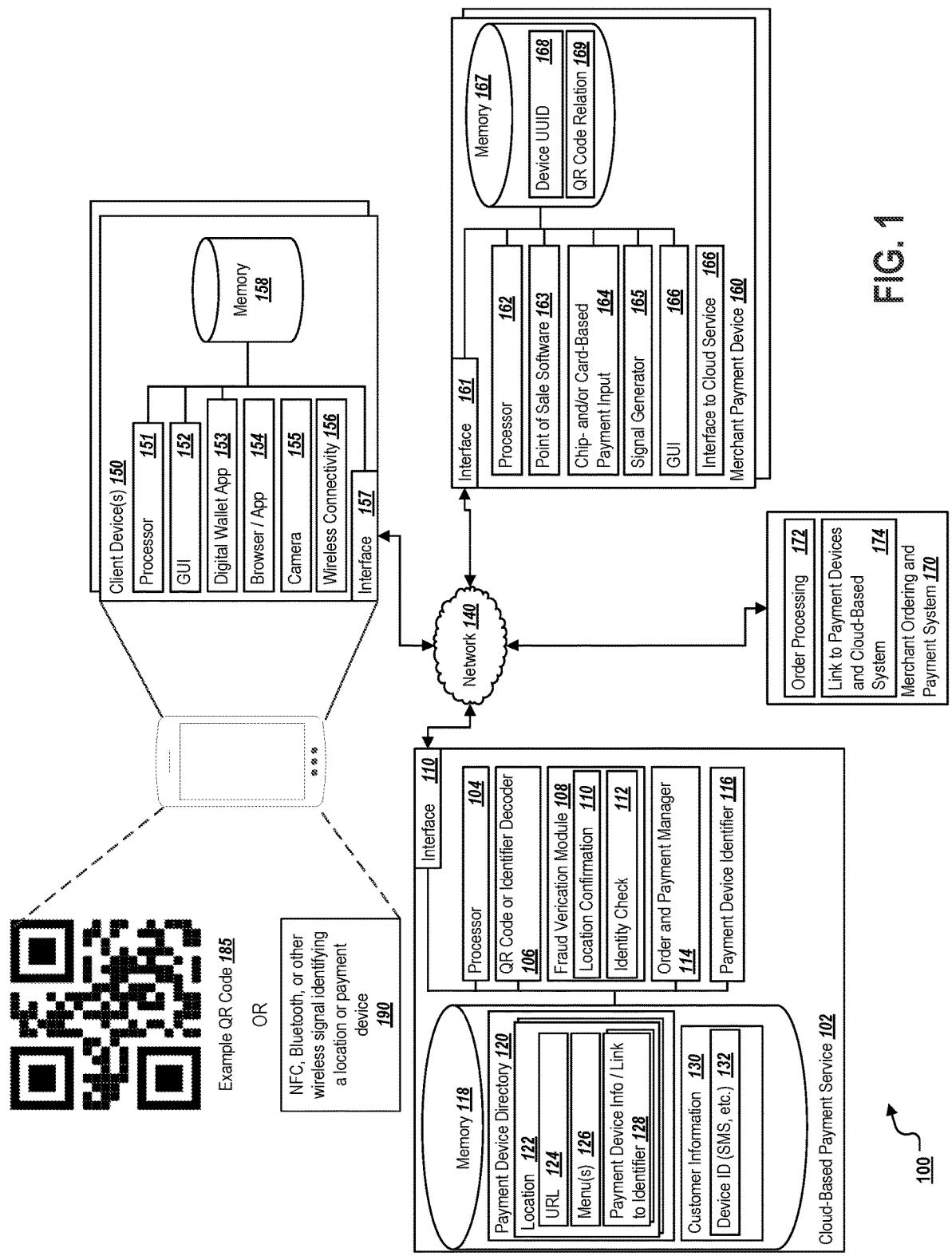
FIG. 1 is a block diagram of a system for providing dynamic connections between mobile users and one or more payment devices via a cloud-based service.

This disclosure describes methods and systems for providing dynamic connections between mobile users and one or more payment devices via a cloud-based service. As COVID-19 has struck, along with recent years of highly contagious flu seasons, businesses have looked for ways to provide social distancing within their establishments in addition to increased convenience for their customers, users, and/or patrons. In the present solution, a unique method applying unique identifiers that are specific to particular payment devices within a business, a cloud-based service managing payments for the business, and the customer's own device are provided to allow for a contact-less payment process that also allows businesses to avoid relatively higher online payment fees (i.e., e-commerce payment processing fees, which are generally higher than transactions processed via EMV chip and contactless methods using store deployed payment devices) and increasing security by coordinating payments to a particular physical payment device at the location of the customer within the business. For example, customers may be able to add items to their order, either through service encounters at the business (e.g., with a waiter, salesperson, etc.) or online interactions that can be used to add goods and services to an order or transaction. In some instances, the order or transaction can be tied to or associated with the customer or the customer's device, and can be relayed to the entity or business via the cloud-based service for fulfilment and/or preparation. For example, customers or users at a location (e.g., a restaurant, store, etc.) can use their own device to place orders, where those orders can then be provided to the corresponding business or entity to fulfil. In other instances, information about an order that has occurred through traditional means (e.g., via a waiter/waitress, salesperson, etc.) can be provided to the customer (e.g., via a text message, email, push notification, etc.), and that order information can be used to associate the customer with a particular transaction and location through submission of the order identifier.

To associate a customer's device with a particular location in the business, one or more locations within the business or entity can be associated with unique identifiers. By obtaining or inputting a particular unique identifier into the customer's device, the particular location where the customer is currently located can be identified based on a pre-defined mapping or set of payment device associations, which can be confirmed by opening a uniform resource locator (URL) or application identified in the unique identifier. Once the location is confirmed, a relatively nearby payment device can be provided with information associated with the current order or transaction associated with the user, and the cloud-based service can send that transaction information to the nearby payment device for completion of the transaction or order. In some instances, a camera on the customer device can be used to scan a QR code or barcode, which can trigger a connection to the cloud-based service or to a web site or application associated with the cloud-based service. In other instances, the customer device can obtain a wireless signal transmitted by or associated with a payment device and/or a particular location in the business or entity. That wireless signal (e.g., Bluetooth, Near-Field Communication (NFC), iBeacon, etc.) may be encoded with or can otherwise provide information identifying a particular location within the business. Using that information, a particular web page or application can be triggered, and a corresponding payment device can be identified as described above, and the transaction information can be provided to that payment device to allow for the transaction to be completed. In still other instances, a payment device that is relatively farther away from the customer, but is currently available or will be available sooner as compared to a relatively closer payment device, may be used or identified instead.

In some instances, the described solution can provide additional protections from fraudulent or accidental transaction attempts. For example, because QR and other codes may be static, and in an effort to prevent fraud or damages to a business using the system (e.g., a fraudulent customer taking a picture of the QR and attempting to order from outside the store), additional security can be provided. In some instances, such order entry may only be allowed within the store or location, such as within a geo-fenced area of a location, or while connected to a particular network or communication beacon. Once the QR code identifies a particular location of a payment device, or where the customer's device indicates they are located, a specific or general location of the customer can be identified based on any suitable location identifier (e.g., through a ping of the device, a sharing of GPS location information, location information from one or more social networks or applications, or other manner). If the customer and the customer's device is not determined to be within the geo-fenced location, then the system can reject the transaction to avoid potential fraud or a non-allowed transaction. If the location is determined to be within the geo-fenced area, then the transaction can proceed as requested.

The payment transaction described herein can be related to a currently outstanding bill or invoice. When the mobile device connects to the cloud-based system, a connection or identification of the corresponding bill or invoice can be made. In some instances, a code or other invoice identifier may be available to or entered by the customer on the mobile device, which can then be provided to the cloud-based payment service during the mobile device's interactions, including in response to providing the information associated with and obtained from the QR or other code. In other instances, such as when the customer is ordering on their device, the particular invoice or bill may be automatically linked to the request to initiate payment. In some instances, there may be multiple current invoices or bills, and the customer can choose which of those to associate with the current payment during the interactions described herein.

In other instances, a determination can be made between an initial QR scan and corresponding payment attempt. In those instances, when a payment is ready to be made (e.g., after reviewing a menu and deciding on an order), the system can provide, via SMS or any other suitable manner, a unique identifier for the customer to enter at the payment device at the time payment is attempted, such that the customer is specifically linked to an order, particularly in non-prepaid situations. In doing so, the QR code and customer can be reconnected to a particular payment device based on their known connection to the SMS number and unique code. This solution can assist customers by reducing fraud or pranks associated with ordering food by someone other than the customer associated with the device, or someone trying to order food without an intention to actual pay, particularly in non-prepaid instances. If a customer associated with a particular SMS number is determined to be an issue or cause problems, that person can be blacklisted, and their SMS number can be blocked from the merchant/business or from the system as a whole. Similar solutions can be combined with SMS verifications and geo-fencing to provide even greater security, by specifically identifying a customer located at the business or location and verifying their identity prior to allowing the transaction to occur.

In general, the described system can also generally allow device-based or SMS-backed blacklisting and/or limited allowed interactions with the system. In response to issues with prior interactions, the customer's device and/or their particular phone number or other SMS identifier can be blacklisted. In some instances, blacklists or the results leading to a blacklist can be shared in the platform or system across businesses, allowing serial offenders to be kept off any business using the platform.

The present solution provides multiple technical and business-related benefits. First, the system allows businesses to have customers still pay via traditional in-person EMV chip and contactless payment devices, among other traditional payment devices, while reducing the chance of contact with germs and viruses, as well as lowering the overall business costs associated with merchant processing fees, as EMV chip and swipe transactions, including EMV contactless, are significantly less expensive as compared with in-app wallet-based payments that are treated at e-commerce processing rates. Such a cost different can be as significant as 1-2% of sales volume. In addition, having the transactions processed as EMV chip or swipe also reduces transaction card fraud, and protects merchants with chargebacks, as well as avoiding card fraud liability shifts that is currently at the merchant's responsibility when not processed as EMV. Thus, by allowing ordering through a web-based functionality with menus or product lists, and connecting to a local device (e.g., an EMV device), businesses can obtain a significantly lower cost as compared to allowing web- or app-based payments.

Further, both mobile device-based payments (e.g., Apple Pay, Samsung Pay, etc.) and card-based payments (e.g., swipe, chip-and-PIN, and contactless, etc.) can be used in the current situation in connection with the EMV devices or other suitable payment devices.

As described, the present solution can provide location-based verifications and authentications of customers, ensuring that orders and payments are associated with trusted customers who are available to order and pay based on business-defined location criteria.

Still further, improved self-checkout can be provided, as well as more convenient checkouts, by connecting customers with a relatively nearby and available payment device. Payment locations can be placed throughout a business or business-related location, allowing the system to direct customers to the appropriate and available payment device for quick and easy checkout. In some cases, that location may be at the customer's table, while in others, defined locations within the business can be provided.

As receipts are provided via an application associated with the system, no physical receipts need to be delivered to the table or person making the payment, thus further reducing required contact between business staff and the customer.

In addition to avoiding contagions, customers performing self-pay via their devices of choice dynamically helps reduce checkout line congestion while still maintaining favorable merchant processing rates, as such transactions are not downgraded by payment services. Because the final transaction uses EMV Chip, EMV Contactless, or even Swipe-based interactions rather than consumer wallet payment types, which typically are considered Keyed Manual inputs, the solution provides merchants advantageous comparative rates.

Finally, the solution allows the customer and their respective device to connect uniquely and seamlessly to a payment device to initiate and finalize payment, thereby ensuring smoother and more satisfactory interactions.

FIG. 1 is a block diagram of an example system 100 for providing dynamic connections between mobile users and one or more payment devices via a cloud-based service. One or more client devices 150 can be associated with one or more customers, and can allow the customer to interact with a cloud-based payment service 102 and merchant payment device 160, as previously described. The client devices 150 may be any suitable device or computing system, including mobile devices such as smartphones, tablets, laptops, smart watches, and others, and may be associated with one or more unique number for messaging and/or calls. As an example, the SMS number, which may be the telephone number associated with the client device 150, or a unique user name or identifier linked to an account on the client device 150, can be used for messaging and/or customer identification. For example, the unique identifier can be an email address, an instant messenger program ID (e.g., for WhatsApp), a globally unique user name or identifier specific to the cloud service 102, or any other suitable method of communication and/or messaging to the customer. In the illustrated example, the client device 150 can be associated with a digital wallet application (or app) 153, a browser or other web-enabled app 154, a camera 155, and one or more wireless connectivity methods and/or protocols 156. The wireless connectivity methods or protocols 156 can include near-field communication (NFC) capabilities and functionality, Bluetooth capabilities and functionality, as well as any similar or other method or capability. The client device 150 may also be associated with one or more various applications to perform different functionality, including payment-related actions. The digital wallet app 153, for instance, may be a general digital wallet, or may be specific to a particular payment system or platform. In some instances, the digital wallet app 153 may be associated with or implemented in a browser or other application 154, allowing for connection via interface 157 to network 140 and the cloud-based payment service 102, as well as the merchant ordering and payment system 170, and then to the merchant payment device 160 identified for completing the transaction or interaction.

The digital wallet app 153 may be specifically associated with payment interactions, or may include functionality used to place one or more orders or transactions with merchants. Alternatively, the browser or other application 154 can be used to initiate and interact with the order. To begin the process, either app may access the camera or cameras 155 of (or associated with) the client device 150 to access a QR code 185 provided by the merchant at which the transaction is to occur, where the QR code is associated with a specific identifier that provides information about a merchant. In other instances, the client device 150 may obtain, via an NFC, Bluetooth, or other wireless signal from a particular transmitter or device (as shown by 190), a unique identifier providing information similar to that of the QR code. In some instances, the QR code 185 or transmitter 190 may be provided by the payment device 150. In general, the unique identifier can identify a particular store, restaurant, or merchant, and, in some cases, a location within that restaurant (e.g., a particular table, seat, or area, such as a bar area in a restaurant or an area of a business, such as an electronics section within a large brick-and-mortar retailer). The unique identifier may be associated with an embedded or referenced uniform resource locator (URL) 124, or a parameter to be associated with a more generic URL 124.

Once the unique identifier is obtained, the digital wallet app 153 or browser 154 can access the URL 124, which can be used to access merchant- and location-specific information associated with the current merchant. That information associated with the unique identifier can include an identification of a particular location 122 at the merchant, a menu or item list 126 offered by the merchant, and/or payment device information 128 (e.g., a particular payment device information 128 servicing that location within or associated with the merchant). Each merchant may be associated with a plurality of unique identifiers, each identifying a particular location 122, as well as different menus or item lists 126 that may be specific to the location 122. For example, some instances may have a particular unique identifier (or unique parameter within the merchant's unique identifier) that identifies the particular location at the merchant. Those locations 122 may have different menu or item lists 126, as is appropriate. For example, in a restaurant scenario, if a first location 122 is associated with a bar, a bar-specific menu (e.g., drinks and appetizers only) may be provided, while a second location 122 associated with a table in a dining room or item list 126 may provide a full dinner menu. Similarly, a third location 122 outside of the merchant may provide a to-go menu. In that instance, the payment device location 128 may be the bar or another location where pick-up orders are obtained. Once the location and linked information is determined, then the corresponding menu or item list 126 can be provided to the customer via the browser 154, digital wallet app 153, or other application provided by the client device 150. In some instances, the menu may be linked to the merchant ordering and payment system 170, where an order can be placed or a prior order can be linked to the current location of the customer, which can then be connected to a particular payment device 160 to complete the interaction/transaction, as described below.

Returning to the client device 150, each client device 150 may be associated with a particular user or customer, or may be accessed by multiple customers. The client devices 150 may also be a client device through which the particular customer uses a digital wallet app 153 or browser 154 to interact with the cloud-based payment service 102, as well as the merchant ordering and payment system 170 and/or the one or more merchant payment devices 160. The client device 150 may include a global positioning system (GPS) chip or other location-determining component or functionality that can allow the client device 150 to identify and share location information. This location-based determination can be used to validate and verify a location of the client device 150, and by connection, the associated customer. In some instances, for fraud protection, the cloud-based payment service 102 and/or the merchant ordering and payment system 170 can verify a location of the customer prior to completing an order, or allowing the payment device identification process to be performed.

As illustrated, the client device 150 may include an interface 157 for communication, at least one processor 151, a graphical user interface (GUI) 152, and memory 158, among the other described components (i.e., the digital wallet app 153, the browser 154, camera 155, and the wireless connectivity components 156).

The illustrated client device 150 is intended to encompass any computing device such as a desktop computer, laptop/notebook computer, mobile device, smartphone, personal data assistant (PDA), tablet computing device, one or more processors within these devices, or any other suitable processing device. In general, the client device 150 and its components may be adapted to execute any operating system, including Linux, UNIX, Windows, Mac OS®, Java™, Android™, or iOS. In some instances, the client device 150 may comprise a computer or computing device that includes an input device, such as a keypad, touch screen, or other device(s) that can interact with one or more client applications, such as one or more mobile applications, including a web browser and mobile wallet application, among others, including those described, and an output device that conveys information associated with the operation of the applications and their application windows to the user of the client device 150. Such information may include digital data, visual information, or a GUI 152, as shown with respect to the client device 150. Specifically, the client device 150 may be any computing device operable to communicate with other illustrated systems via network 140, as well as with the network 140 itself, using a wireline or wireless connection. In general, client device 150 comprises an electronic computer device operable to receive, transmit, process, and store any appropriate data associated with the environment 100 of FIG. 1.

Although illustrated as a single processor 151 in FIG. 1, multiple processors may be used according to particular needs, desires, or particular implementations of the environment 100. Each processor 151 may be a central processing unit (CPU), an application specific integrated circuit (ASIC), a field-programmable gate array (FPGA), or another suitable component. Generally, the processor 151 executes instructions and manipulates data to perform the operations of the client device 150. Specifically, the processor 151 executes the algorithms and operations described in the illustrated figures, as well as the various software modules and functionality, including the functionality for sending communications to and receiving transmissions from the cloud-based payment service 102, the merchant payment device 160, the merchant ordering and payment system 170, and other client devices 150, as well as to other devices and systems. Each processor 151 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, the client device 150 can include memory 158. Memory 158 may represent a single memory or multiple memories. The memory 158 may include any memory or database module and may take the form of volatile or non-volatile memory including, without limitation, magnetic media, optical media, random access memory (RAM), read-only memory (ROM), removable media, or any other suitable local or remote memory component. The memory 158 may store various objects or data, including financial data, user and/or account information, administrative settings, password information, caches, applications, backup data, repositories storing business and/or dynamic information, and any other appropriate information associated with the client device 150, including any parameters, variables, algorithms, instructions, rules, constraints, or references thereto. As illustrated, memory 158 includes information associated with a customer or user associated with the client device 150, and may include information associated with the one or more illustrated apps and functionality.

The interface 157 of the client device 150 is used for communicating with other systems in a distributed environment—including within the environment 100—connected to the network 140, as well as with other systems communicably coupled to the network 140. Generally, the interface 157 comprises logic encoded in software and/or hardware in a suitable combination and operable to communicate with the network 140 and other components. More specifically, the interface 157 may comprise software supporting one or more communication protocols associated with communications such that the network 140 and/or interface's hardware is operable to communicate physical signals within and outside of the illustrated environment 100. Still further, the interface 157 may allow the client device 150 to communicate with other components illustrated within or outside of system 100.

Network 140 facilitates wireless or wireline communications between the components of the environment 100 (e.g., the client devices 150, the cloud-based payment service 102, the merchant payment devices 160, and the merchant ordering and payment system 170, etc.), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the cloud-based payment service 102, the merchant ordering and payment system 170, etc.) may be included within or deployed to network 140 or a portion thereof as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

GUI 152 of the client device 150 interfaces with at least a portion of the environment 100 for any suitable purpose, including generating a visual representation of any particular application (e.g., digital wallet app 153 or browser 154, as well as images captured by camera 155), any components or presentation associated with the cloud-based payment service 102, or any of the other components. In particular, the GUI 152 may be used to present screens and information associated with the illustrated applications and functionality, as well as to view and interact with various web pages, applications, and web services located local or external to the client device 150. Generally, the GUI 152 provides the user with an efficient and user-friendly presentation of data provided by or communicated within the system. The GUI 152 may comprise a plurality of customizable frames or views having interactive fields, pull-down lists, and buttons operated by the user. In general, the GUI 152 is often configurable, supports a combination of tables and graphs (bar, line, pie, status dials, etc.), and is able to build real-time portals, application windows, and presentations. Therefore, the GUI 152 contemplates any suitable graphical user interface, such as a combination of a generic web browser, a web-enable application, intelligent engine, and command line interface (CLI) that processes information in the platform and efficiently presents the results to the user visually.

As used in the present disclosure, the terms "computer" and "computing device" are intended to encompass any suitable processing device. For example, client device 150, merchant ordering and payment system 170, and merchant payment device 160 may each be any computer or processing devices such as, for example, a blade server, general-purpose personal computer (PC), Mac®, workstation, UNIX-based workstation, or any other suitable device. Moreover, although FIG. 1 illustrates individual components in some case, some or all of the systems can be implemented using a single system or more than those illustrated, as well as computers other than servers, including a server pool. In other words, the present disclosure contemplates computers other than general-purpose computers, as well as computers without conventional operating systems. Similarly, the client device 150 may be any system that can request data and/or interact with the other systems. In general, each illustrated component may be adapted to execute any suitable operating system, including Linux, UNIX, Windows, Mac OS®, Java™, Android™, Windows Phone OS, or iOS™, among others.

The cloud-based payment service 102, as illustrated, may be any site, system, or service, including a service provided within a cloud environment, such as within network 140, that can create dynamic connections between a customer and particular payment devices located at the merchant. As illustrated, the cloud-based payment service 102 can be managed by a standalone system, although in many implementations, the service 102 can be provided significantly or solely within the cloud. References to physical components in this description are just one implementation, and the service 102 may be implemented in alternative formats and implementations with access to shared and/or dedicated resources and computing power and processors where the functionality can be performed. Further, the service 102 can include, among other components, one or more applications, entities, programs, agents, or other software or similar components capable of performing the operations described herein.

As illustrated, the service 102 can be associated with at least one processor 104, an interface 110, a QR code or identifier decoder 106, a fraud verification module 108, an order and payment manager 114, a payment device identifier 116, and memory 118. The at least one processor 104 may be similar to or different than processor 151, including as nodes in a cloud infrastructure. Similarly, interface 110 may be similar to or different than interface 157. Memory 118 may be similar to or different than memory 158, and may represent a single memory, or may be a distributed set of memory and storage available at one or more locations within and/or outside the cloud environment. As illustrated, memory 118 stores a payment device directly 120, which can be associated with a set of locations 122 corresponding to the various merchants making use of the service 102. As described, locations 122 may be associated with specific URLs 124, one or more menus or item lists 126, and a set of payment device information 128 that can be used to link customers and their respective transactions to particular payment devices 160 of the corresponding merchant. In addition to the payment device directory 120, memory 118 can store customer information 130. The customer information 130 can identify or provide information about various customers who have previously interacted with the cloud-based payment service 102, and can store device identifier information 132 (e.g., SMS or phone numbers, as well as other account-related information uniquely identifying the customer).

The QR code and identifier decoder 106 can perform functionality to decode and otherwise derive the specific information obtained from the client device 150. That information can then be used to direct the service 102 to identify a particular location 122 and/or URL 124 corresponding to the client device's discovery. In response to identifying the particular location 122, the order and payment manager 114 can assist in managing an ordering or transaction interaction with the customer associated with the client device 150, including by allowing a new order or transaction to be performed (e.g., based on the menu or item list 126), or by determining or identifying an existing transaction or interaction associated with the customer. The order and payment manager 114 may be a part of the service 102, or the manager 114 may connect the cloud-based payment service 102 to a merchant-managed ordering and payment system 170. Additionally, any orders interacted or submitted through the cloud-based payment service 102 can be provided to the merchant ordering and payment system 170, such as through the illustrated link 174. The merchant ordering and payment system 170, described below, can then process the order, such as through an order fulfillment system or process, or can provide the order to a kitchen display, printer, or employee, allowing the order to be completed. The order and payment manager 114 can act as an interface to the relevant merchant systems managing the order process generally. In still some other instances, the client device 150, in addition to providing the unique identifier, can identify a particular order number that may have been obtained through an external ordering process (e.g., a traditional method, where a ticket is provided, or where an email or other electronic communication is provided in response to an order or transaction). That order number can be used, via the order and payment manager 114, to link to one or more existing orders already available at the merchant via the merchant ordering and payment system 170. Once linked, the completion of the transaction can then be managed by the payment service 102 and its operations in identifying the correct payment device 160 for the transaction to be completed.

The fraud verification module 108 can perform operations associated with confirming a customer's identity in some instances, as well as whether the customer and his or her client device 150 is at a location allowed by the service 102. In some instances, a location confirmation operation 110 can be performed to determine a location of the customer. In some instances, this may include a request to the client device 150 to obtain location information associated with the device 150, which can be compared to one or more rules defined for the location 122. Other fraud verification operations can include an identity check analysis 112 to determine the customer associated with the client device 150. The identity check can include determining if a device ID 132 of the client device 150 is on any blacklists of either the merchant and/or the service 102 as a whole. The identity check can also confirm whether an order number or identifier provided is actually associated with the customer who submitted the order.

The payment device identifier 116 can use the information received from the client device 150 identifying a particular location 122 to determine a particular payment device 160 to associate the transaction with, and to send the customer to complete the transaction. In some instances, the location 122 may be associated with or otherwise linked to a specific payment device 160. When that location 122 is received or identified, transactions can be automatically assigned to the linked device 160. In alternative implementations, the service 102 and the payment device identifier 116 can perform a more advanced determination to choose from two or more payment devices 160 at the merchant. The analysis can be based on any number of suitable factors, including a determination that another customer is currently interacting with a particular payment device 160 that otherwise would have been suggested to the customer. In those instances, a next closest and available payment device 160 can be identified and suggested to the customer.

Once the particular payment device 160 is identified, the cloud-based payment service 102 can transmit an indication of the payment device 160 to the client device 150 (e.g., via the digital wallet app 153, browser or another app 154, and/or any other suitable channel, including an SMS message to the number associated with the client device 150. Additionally, the payment device identifier 116, or another component or functionality of the service 102 such as the order and payment manager 114, can send transaction information to the corresponding order or interaction to the identified payment device 160, such as through the interface to the cloud service 166 associated with the identified merchant payment device 160. In some instances, the payment device identifier 116 and/or the order and payment manager 114 may provide customer and order information, as well as the identified payment device 160, to the merchant ordering and payment system 170. The merchant ordering and payment system 170 can then share the transaction information to the identified merchant payment device 160, which can prepare itself for payment at the appropriate time.

The merchant payment device 160 can be any suitable payment device or terminal, including a traditional or countertop payment terminal, a wireless terminal, a point-of-sale (POS) terminal, or any other suitable computing device able to interact with customers and receive credit, debit, and similar payment cards (e.g., as an EMV-capable device), as well as mobile payments associated with relevant mobile payment systems (e.g., Apple Pay, Google Pay, Android Pay, etc.), and any other suitable means of payment. In some instances, the merchant payment device 160 may accept other forms of payment, including cash (e.g., via an integrated receptacle), Bitcoin or other cryptocurrency, gift cards, and other suitable payments. The payment device 160, as illustrated, can include at least one processor 162, an interface 161 (to the network 140), point-of-sale software 163 (in some implementations), chip- and/or card-based payment input 164, a signal generator 165, a GUI 166, the interface to the cloud service 166, and memory 167.

When a customer has connected to the cloud-based payment service 102 and connected with a particular transaction or interaction, the payment device 160 determined to be used can receive a transmission of information or an indication associated with the transaction to be completed at the device 160. In some instances, that information or indication can provide details associated with the transaction—in particular, the amount of the transaction. In some instances, other transaction details may be included, such as a listing of the items on the order being finalized/transacted. The seat or table number where the customer had been, or a server or employee who assisted with the sale may also be presented. Still further, any other relevant information to the transaction may be presented. In some instances, the customer may need to verify their identity to the payment device 160 to insure the customer is paying for the transaction they intended and to avoid mistakes. Verification may occur in any suitable manner, including a scan of a code provided to the client device 150 associated with the customer and provided by the cloud service 102, manual entry and verification of a code received at the client device 150 from the service 102 and input into and checked by the payment device 160, or a wireless connection or handshake performed between the payment device 160 and the client device 150 to confirm the customer's identity, among others, can be used.

The POS software 163 can be used to complete the transaction after receiving the details for a specific order and, optionally, confirming the identity of the customer. The POS software 163 can receive payment input from a chip- and/or card-based payment input 164, as well as any other interface for receiving payment information. The chip- and/or card-based payment input 164 can receive credit cards, debits cards, gift cards, and others, and may be a card swipe system, a chip-and-pin system, a contactless payment system (e.g., based on a wireless chip within a card, or based on payment information received via the client device 150), a biometric payment system, or any other suitable input, including a cash receiver component. GUI 166, which may be similar to GUI 152, can present instructions to the customer, as well as information about the transaction. In general, GUI 152 can present information related to the POS software 163 of the payment device 160, and can indicate success and failure of attempted transactions. In some implementations, the POS software 163 can be used by employees of the merchant to input orders and interact with the merchant ordering and payment system 170. In others, the payment devices 160 may be limited devices, used only to receive payments. As illustrated, the payment device 160 may include a signal generator 165 or QR code, which may be used to associate the client device 150 with that particular location. Either the signal generated by the signal generator 165 or the captured QR code can be provided by the client device 150 to the service 102, allowing a connection to be made between the client device 150 and the payment device 160.

Memory 167 of the payment device 160 can be similar to or different from memories 158 and 118. As illustrated, memory 167 can store a device unique ID 168, as well as stored information on a particular QR code relation 169. The QR code relation 169 can be used to present, via the GUI 166, the QR code associated with a location 122 at which the payment device 150 is located.

The interface to the cloud service 166 can be used to receive information from and provide information to the cloud-based payment service 102, and may be a dedicated interface for communication between the systems, or may be an API or set of APIs for interacting with the service 102. The interface 166 may also be used to communicate with the merchant ordering and payment system 170 via link 174. When a transaction is completed at the payment device 160, information about that transaction can be relayed to the appropriate systems so that the transaction can be confirmed, with the merchant system 170 and/or the client device 150 being provided a confirmation of the transaction. Receipts may be provided to the customer via any suitable communication channel, or a physical receipt can be printed at the device 160.

Any number of merchant payment devices 160 may be provided. In some instances, a relatively small number may be available, while in other instances, such as a retailer with a large square footage, many payment devices 160 may be provided, each associated with different locations within the store. The number of merchant payment devices 160, and the placement of those devices 160, can be determined on a case-by-case basis. The information about their relative locations may be stored in the payment device directory 120, including information on relative locations to a particular QR code 185 or signal 190, or to one or more other locations 122. In doing so, backup devices 160 can easily be determined as The merchant ordering and payment system 170 may be any suitable system managed or associated with the merchant, and encompassing or including an order processing system 172. After the client device 150 sends a particular unique identifier to the cloud-based payment service 102, and the menu or item list 126 is made available to the customer, one or more orders can be selected and placed. The ordering may be done directly through the merchant ordering and payment system 170, or through the order and payment manager 114 via the service 102, where orders placed are provided to the order processing component 172 of the merchant ordering and payment system 170.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
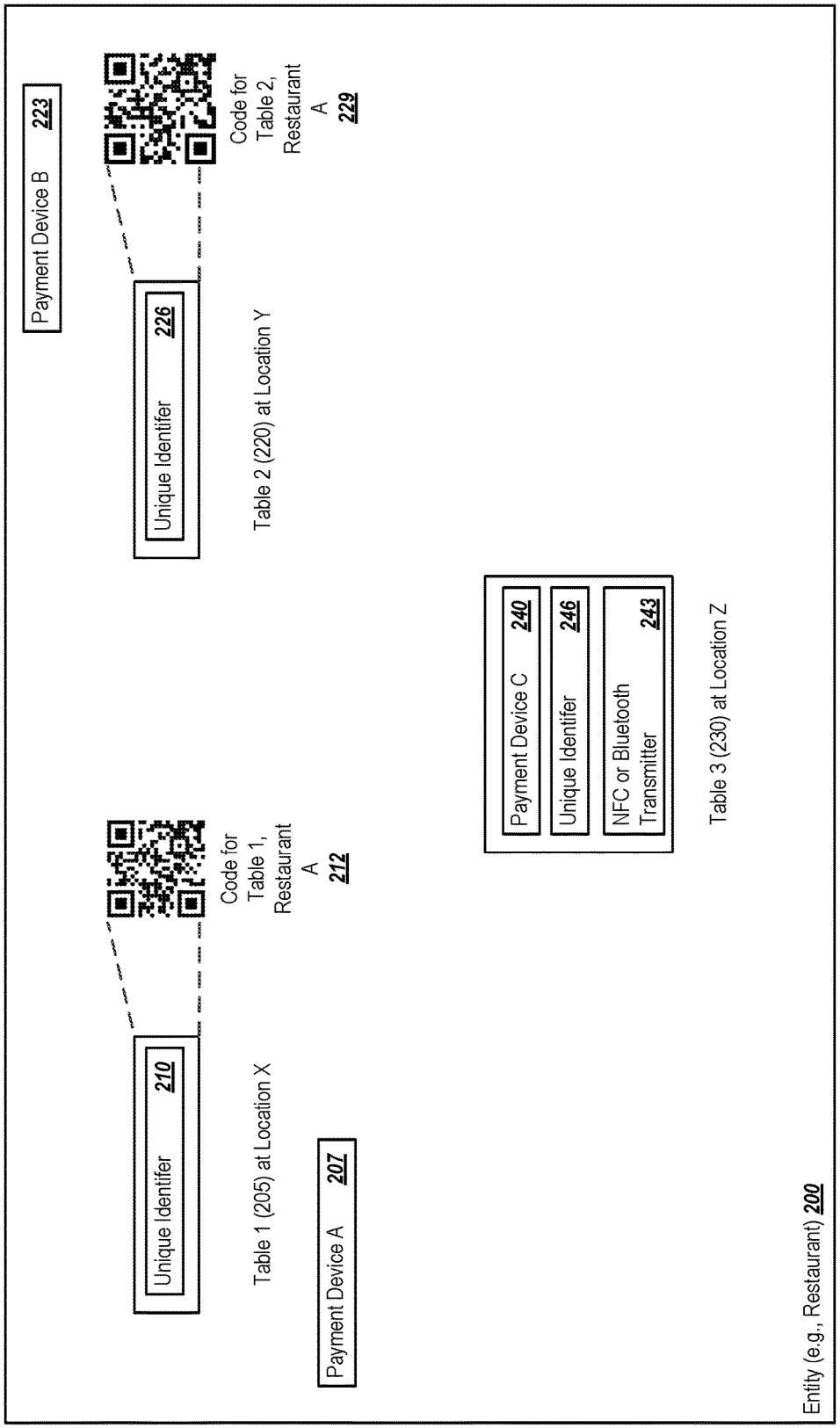
FIG. 2 illustrates an example entity including multiple tables, each table associated with a corresponding payment device and unique identifier.

FIG. 2 illustrates an example entity 200 including multiple tables, each table associated with a corresponding payment device and unique identifier. As noted in the illustration, entity 200 may be a restaurant with tables in different places within the physical location. Here, three tables are illustrated: table 1 (205), table 2 (220), and table 3 (230). Each of the tables, as illustrated, are located in different parts of the restaurant. In the present illustration, different payment devices are located throughout the restaurant, with some relatively closer to certain tables than others. For example, payment device A 207 is relatively closer to Table 1 (205) than either payment device B 223 or payment device C 240. As such, a customer sitting at table 1 (205) would want to be directed to payment device A 207 when ready to pay using the present solution, which, using the system described in FIG. 1, would occur.

As illustrated, Table 1 (205), or somewhere nearby it, can be associated with a unique identifier 210 (illustrated as QR code 212, which encodes "Table 1—Restaurant A"). This unique identifier 210 may, in some instances, also be associated with a URL specific to the restaurant and a cloud-based payment service. That URL can be navigated to upon scanning, allowing the cloud-based payment service to determine the nearest or most convenient payment device for sending the transaction. Similarly, table 2 (220) has a unique identifier 226 (illustrated as QR code 229, which encodes "Table 2—Restaurant A"). Customers scanning that identifier 226 can be directed to payment device B 223. Table 3 (230) may be associated with an NFC or Bluetooth transmitter 243, which can broadcast unique identifier 246, which may identify "Table 3—Restaurant A". Customers obtaining the identifier 246 and providing it to the cloud-based payment service can be directed to the relatively closest payment device C 240. Once payment is completed at the respective terminal, payment can be completed through traditional rails, or may be completed through the cloud-based service, as well as any other suitable means. Confirmation of the payment can be provided to the customer, the merchant's systems, and the cloud-based systems, regardless of how the payment is transacted.

Figure 3:
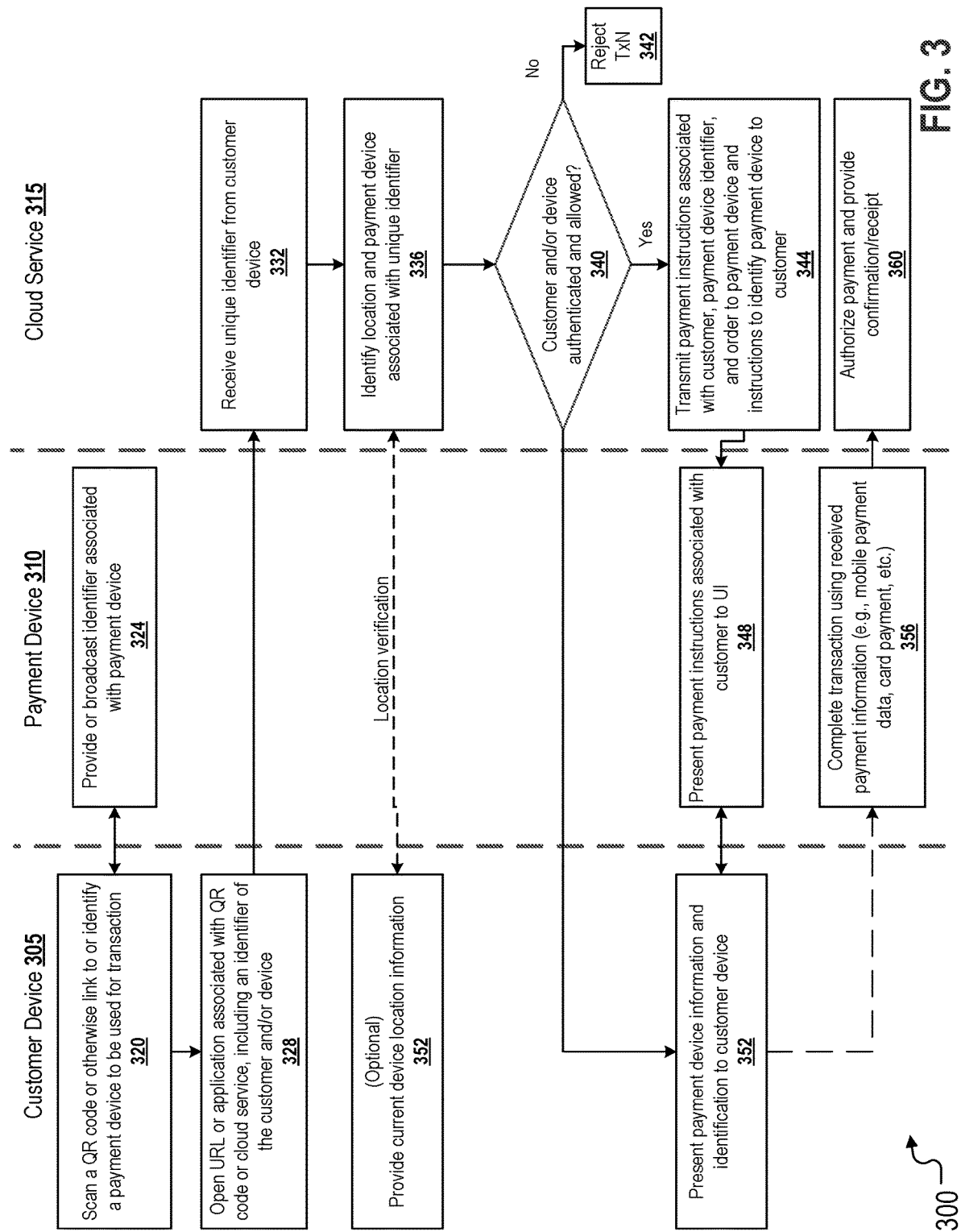
FIG. 3 is a swim-lane diagram describing an example method for dynamically creating connections between users and payment devices via a cloud-based service.

FIG. 3 is a swim-lane diagram describing an example method 300 for dynamically creating connections between users and payment devices via a cloud-based service. The illustrated example includes operations performed by a customer device 305, a particular payment device 310 from a plurality of payment devices, and a cloud-based payment service 315. These components may be similar to or different than those described in FIGS. 1 and 2. Example method 300 is meant to be an illustrative example, with alternative operations being understood as described herein by persons of skill in the art.

At 320, the customer device 305 can scan a QR code or otherwise identify a unique identifier corresponding to a particular location within a merchant or entity's place of business or operation. As illustrated, in some instances, the payment device 310 may provide or otherwise broadcast a unique identifier to be used for the payment process. In other cases, beacons or other transmitters can broadcast the identifier at particular locations that are not specifically associated with the payment device(s), but that instead identify a relative location within the place of business. Similarly, QR codes (or bar codes or other suitable encoding techniques) can be placed on each table, at each display, or at any suitable location(s) which can be used by customers and captured by the customer's device 305. In some instances, the unique identifier may be encoded with a URL or other location, while in others, an application associated with the cloud-based payment service located on the customer device 305 can be used to manually input relevant information.

At 328, a URL or application associated with the cloud-based payment service can be opened or accessed by the customer device 305. The QR code or other unique identifier may specify the particular URL or application to be accessed, and/or may provide a particular parameter or page that specifically includes the unique identifier or information associated with and identifying the unique identifier. The URL or application can be associated with cloud service 315, and the request can be provided via any suitable network connection or communication method.

At 332, the cloud service 315 can receive the QR code or other unique identifier obtained by the customer device 305. In addition to the unique identifier, the cloud service 315 may also receive customer information, as well as order information, with the communication and/or interaction. As noted, the unique identifier can be passed through the URL or application, in some cases. In some instances, the QR code or unique identifier may specifically identify a particular payment device 310 from a plurality of payment devices, while in others instances, a particular location can be identified, and the cloud service 315 can determine, at 336, a particular payment device associated with the unique identifier. Determining the location scanned or obtained by the customer may be a first operation of 336, and a determination of the corresponding or suggested payment device may be a second operation.

For example, the particular payment device associated with the unique identifier may be specifically mapped to the unique identifier, creating a one-to-one link between the identifier and the payment device. In other cases, the particular payment device may be determined based on a determination of a specific location associated with the obtained unique identifier. Once that specific location is determined, a calculation is made to determine a relatively closest payment device to use for processing the payment. In those instances, as well in the specifically mapped instances, one or more alternative payment devices may be identified in cases where the first determined payment device is unavailable or in use. For example, if another customer is already interacting with the first determined payment device, a second-best option can be determined and provided to the customer. The cloud service 315 may store an identification and/or listing of payment devices, or a dynamic determination can be made based on relative and known distances between the locations associated with the QR code or other unique identifier and the known locations of the various payment devices available. For example, each or some locations and/or store equipment can be outfitted or associated with iBeacon technology, or another similar technology to provide location information. The customer device can interact via Bluetooth to detect the radio signal strength of the iBeacon or similar device to gauge the relative closeness of such a device, either in general, or as compared to other possible devices or locations.

In some implementations, a location verification can be performed with the customer device 305 after the unique identifier is received by the cloud service 315. In those instances, any suitable location verification of the customer device 305 can be performed. For example, and as shown at 352, the cloud service 315 can request, and the customer device 305 can provide, current device location information. In some instances, that current device location information may include a GPS- or assisted GPS-based ping and confirmation of the location of the device 305 to confirm that the device 305 is at the location associated with the QR code or unique identifier, or within a predefined distance from that location. In some instances, the request for current device location information can request a list of wireless networks available to the customer device 305, while in others, proximity or connection to a beacon or other wireless signal can be confirmed.

At 340, a determination is made as to whether the customer device 305 and/or the associated customer are authenticated and allowed to process payments via the cloud service 315. In some instances, that verification for the customer and/or the device 305 may be based on a blacklist or other restrictive list maintained by the cloud service 315, either specific to the merchant or generally for the cloud service 315. The customer and/or the device 305 may be associated with a phone number or other customer- or device-specific identifier. Should a customer or device 305 be associated with prior issues, such as failure to pay for an order, invalid payments, or other relevant issues, the operator of the cloud service 315 and/or the merchant themselves can request the customer and/or the device 305 to be prohibited from transactions using this solution. Alternatively, if the location verification fails and the customer and/or the device 305 is not within the allowed area for a transaction to occur, then the process may not be allowed. In such cases, at 342, the attempted transaction can be rejected, and suitable communications can be provided. If the customer and the device 305 are authenticated and allowed to proceed, method 300 continues at 344.

At 344, the cloud service 315 can perform two actions: first, the payment instructions and information associated with the customer and order can be provided to the identified payment device 310 for use in completing the transaction. Simultaneously, concurrently, or in combination with that transmission, the cloud service 315 can provide the customer device 305 with an indication of the particular payment device at which payment can be completed. At 348, payment instructions and an interface to complete the payment associated with the customer and the customer device 305 can be presented to a UI of the identified payment device 310 based on the information provided from the cloud service 315. Similarly, at 352, the customer device 305 can present an identification of the particular payment device to be used for completing the transaction, including, in some instances, directions to or information identifying the particular payment device 310.

At 356, the customer can interact with the payment device 310 to complete the transaction. The payment device 310 can receive the payment information via any suitable manner, including a card-based payment (e.g., chip-and-PIN, magnetic stripe-based payment, etc.), a mobile device-based payment interacting with the payment device 310 (e.g., Apple Pay, Android Pay, etc.), gift card transaction, PayPal or Venmo, cryptocurrency-based payment, cash-based interaction via a dedicated slot or input, or any other suitable manner. The payment device 310 can provide the payment information to the cloud service 315 for further authentication and validation, as well as completion at 360, or the payment device 310 can use traditional payment rails directly. The outcome of the payment interaction can be provided to the cloud service 315, which can update both the customer and the merchant of the completed transaction and provide associated receipts and confirmations.

Figure 4:
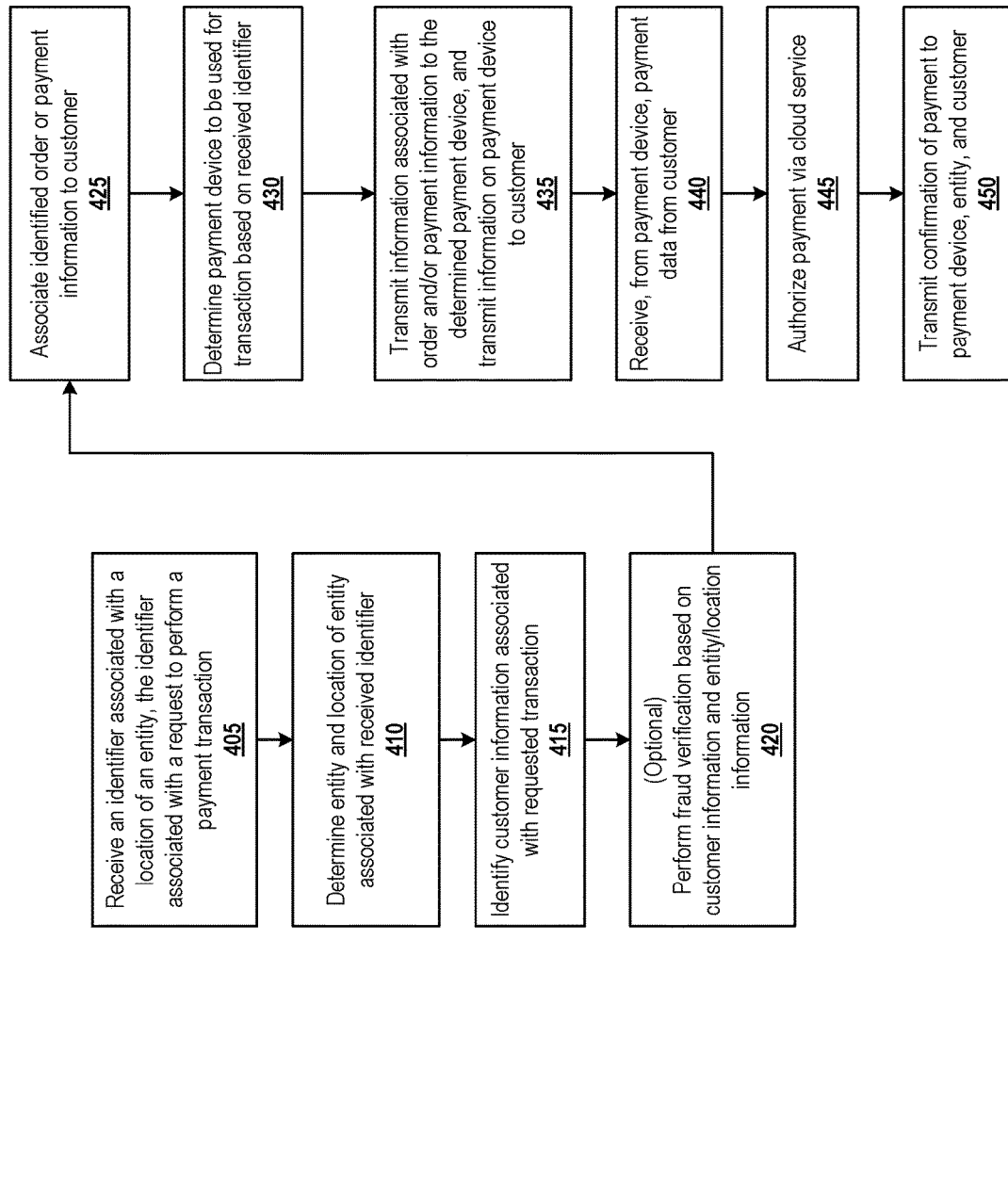
FIG. 4 is a flowchart describing a method for dynamically associating a transaction and associated user at a cloud-based service, where the cloud-based service then sends transaction information to a corresponding and nearby payment device at the physical location of the user and a location within the entity or business at which the transaction is being completed.

FIG. 4 is a flowchart describing a method 400 for dynamically associating a transaction and associated user at a cloud-based service, where the cloud-based service then sends transaction information to a corresponding and nearby payment device at the physical location of the user and a location within the entity or business at which the transaction is being completed.

At 405, an identifier associated with a location of an entity (e.g., a merchant or other business) is received. The identifier is associated with a request to perform a payment transaction, such as completing an order for food, or completing an order of goods or services. The identifier may include a unique location identifier in some instances, where the cloud-based service can match or otherwise identify the specific location associated with the identifier. The identifier may be received from a customer or client device, such as a mobile phone, tablet, smart watch, or other computing device. In some instances, the customer device may obtain the identifier by capturing, using a camera of the customer device, a visual code or encoding that stores or is associated with the identifier. In some instances, such as where the identifier is encoded within a QR code or barcode, or other visual encoding, additional information, such as a website URL or an instruction to open, launch, or execute a particular mobile application may also be encoded therein. Alternatively, the customer device may already be executing a relevant application associated with the cloud-based payment service, and can obtain and input the captured identifier into the relevant application. In some other instances, the identifier may instead be broadcast as a wireless signal (e.g., from NFC, Bluetooth, etc.), and can be captured/identified by the customer device and then provided to the cloud-based service for analysis when the payment is ready to be made.

At 410, the cloud-based service can use the received identifier to determine an entity associated with the request, as well as a location within the entity associated with the specific identifier. In some instances, an entity identifier may be embedded in the communication or transmission received at 405, and may be separate from the unique identifier. Alternatively, the unique identifier may implicitly or explicitly identify the entity associated with the request without the need to separately identify the entity or merchant at which payment is to be completed.

At 415, user information associated with the customer requesting the payment transaction can also be identified. The user or customer information can be embedded or included within the transmission providing the initial identifier, determined in a separate interaction, or based on other information or parameters associated with the communication with the cloud-based service. In some instances, the user information identification may include obtaining or requesting location information associated with the customer, or otherwise confirming at a known address or communication channel with the customer that they are performing the interaction.

Figure 5:
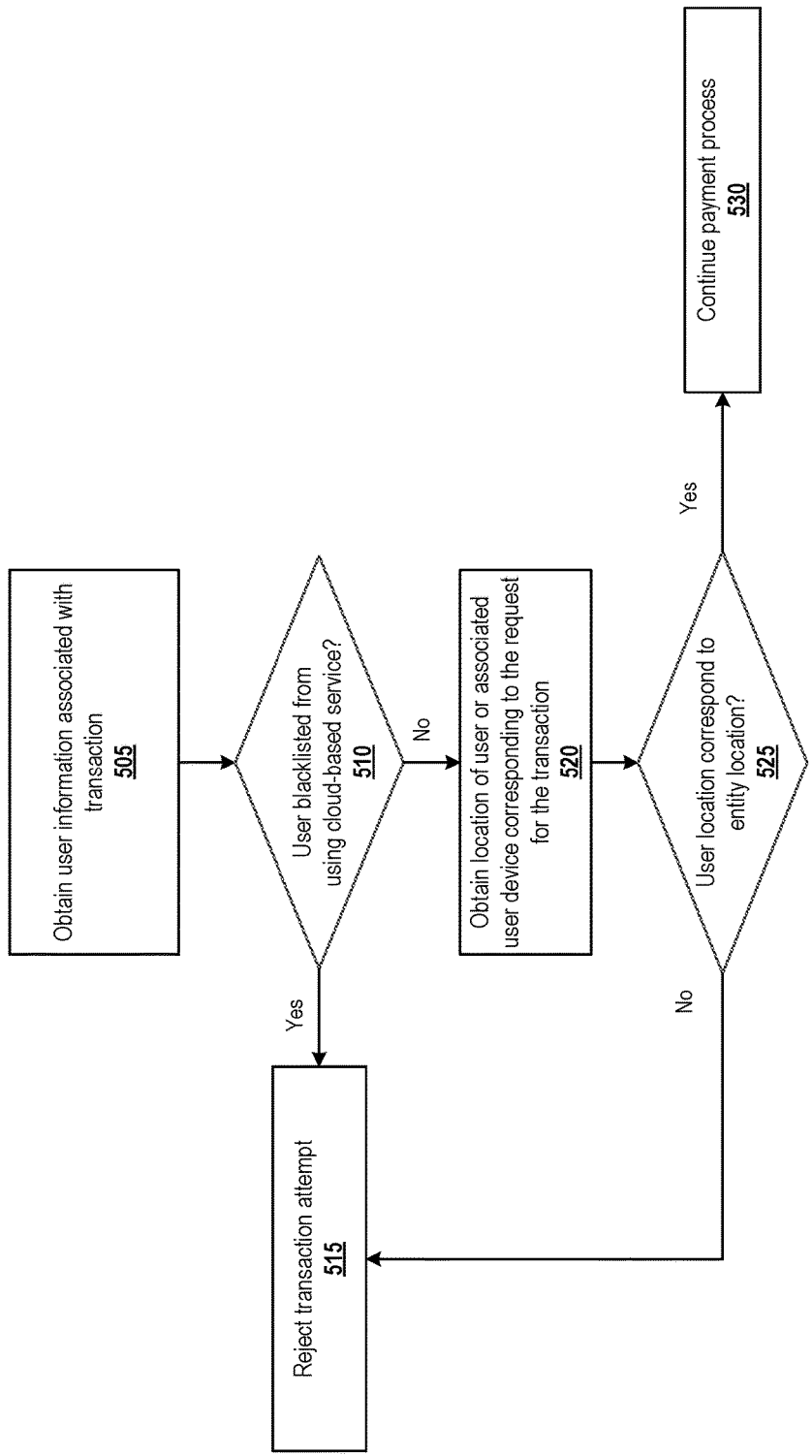
FIG. 5 is a flowchart illustrating example verifications and protections used during the method described in FIG. 4.

Optionally, at 420, a fraud verification can be performed based on the user information and/or the entity and the location information. FIG. 5 is a flowchart illustrating example verifications and protections used during the method 400 described in FIG. 4, and in particular as associated with 420 itself.

At 505, user information associated with the transaction is obtained, similar to the operations of 415. User information may be received with the request, or after user authentication into the cloud-based service. In some instances, other suitable information can be used to identify the user/customer associated with a request, including login credentials, MAC addresses, parameters included in an HTTP request, or other information.

At 510, a determination can be made as to whether the user or customer is blacklisted or otherwise restricted from using the cloud-based service, either with the merchant associated with the current transaction, or with the service as a whole (e.g., due to issues with various other merchants). If the customer is blacklisted or otherwise restricted, then the transaction attempt can be rejected at 515. If, however, the user is allowed to use the payment service, then additional verifications may be used.

At 520, for example, a location of the customer and/or the associated customer device associated with the request for the transaction can be obtained. The location may be obtained, for example, by triggering a ping to the customer device for location information (e.g., from a GPS coordinate). Alternatively, the device may identify itself as within a particular geo-fence, or connected to a particular wireless network, or as connected to a particular beacon or other wireless transmission that can be used to approximate the location of the device. At 525, a determination is made as to whether the customer location corresponds to the entity's location at which the transaction is to occur, or to within a particular allowed area or location around or nearby the entity. If so, the payment process can continue at 530; if not, the transaction attempt can be rejected at 515.

Returning to FIG. 4, at 425, a particular order and/or item being ordered, or alternatively, payment information or details, can be associated to the customer interacting with the system. In some instances, an existing order may be linked to the process, such as a pre-ordered meal or items for pickup. In other instances, the present solution can incorporate mobile ordering with the dynamic payment process, such that a menu of items can be presented to the customer via the customer's device, and one or more items can be added and/or customized for purchase in the transaction. In some cases, multiple orders or items may be available for purchase or transaction, and the customer may be required to identify which of the orders/items are to be completed in the current interaction. In some instances, the request to initiate the payment transaction may be started after the customer selects a particular order or item to complete, with the initial request including an indication or information about the particular order or item included or referenced in the request.

At 430, a particular payment device, determined from a plurality of payment devices associated with an entity, can be determined to be used for completing the current transaction. The particular payment device may be specifically linked to the unique identifier received at 405, or may be dynamically determined based on the location identified or associated with the received identifier. The particular payment device may be a closest payment device to the location identified, or may be a closest payment device that is currently available to the customer. Alternatively, the particular payment device may be located in a more secluded portion of the entity's place of business, and may provide a secure or otherwise less-populated location at which to complete the transaction. In some instances, the intended payment type may be the activating factor when doing such payment device selection. However, in many cases, the payment device may support all intended and merchant-allowed payment processing tender types. In the event that there are certain payment types requiring distinct payment devices, then such payment type logic can be included as a factor in the determination of the particular payment device to be used. For example, if the customer has indicated that they would prefer to pay with cash, a payment device capable of receiving bills may be identified from among a plurality of payment devices. In general, the payment devices may only provide the ability to input payment credentials and/or payment methods. The input methods may include, for example, the actual input of card data (EMV, SWIPE, NFC, etc.). Relevant information confirming the customer and/or the order number being paid for may be presented on a GUI associated with the payment device, such that the customer can visually confirm that they are at the correct device. In some instances, other wireless handshakes between the mobile device and the particular payment device can be performed to confirm that the payment device being used by the customer is the particular payment device as intended and indicated by the system. In other instances, a visual marking or other indicator attached to or associated with the particular payment device can be available for comparison to information identifying the particular payment device presented to the customer on the customer's mobile device.

At 435, information associated with the order and the payment information to be completed can be provided to the particular payment device, and information associated with the particular payment device can be transmitted to the customer and/or the customer device. The order and payment information can then be presented at the payment device when the customer arrives. Information sent to the customer can be presented on the customer device, and can identify which of the plurality of payment devices are to be used. In some instances, a set of directions from the location associated with the received identifier can be provided, allowing the customer to quickly ascertain the location of the payment device.

At 440, the cloud-based service can receive, from the payment device, payment data from the customer as received at the payment device. Using that information, the cloud-based payment service can perform and authorize payment at 445. In some instances, traditional payment rails can be used by the payment device, with information about the outcome of the transaction being provided to the cloud-based service upon completion. At 450, confirmation of the payment can be transmitted to the payment device, the merchant or entity, and the customer or customer device.

Certain novel aspects of the subject matter of this specification are set forth in the description and claim provided in this document.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the different functions can be implemented using "engines," which broadly refer to software-based systems, subsystems, or processes that are programmed to perform one or more specific functions. Generally, an engine is implemented as one or more software modules or components, installed on one or more computers, in one or more locations. In some cases, one or more computers can be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing models described in this specification can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claim in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, comprising:
    obtaining, by one or more processors of a cloud-based payment service system and from a mobile device of a customer, a unique identifier that identifies a location of the mobile device within an entity and a request to perform a payment transaction at the entity, wherein a connection between the cloud-based payment service system and the mobile device is automatically initiated in response to the mobile device scanning a code comprising the unique identifier and a URL (Uniform Resource Locator) of the cloud-based payment service;
    determining, by the cloud-based payment service and based on the unique identifier, the entity and a first location within the entity;
    determining, by the cloud-based payment service and based on the first location within the entity, from a plurality of payment devices at the entity, a particular payment device at which the payment transaction is to be completed;
    in response to determining the particular payment device:
        generating a verification code for the payment transaction and the customer;
        transmitting, via a first signal from the cloud-based payment service to the mobile device of the customer, the verification code and an indication of the particular payment device at which the payment transaction is to be completed, wherein the customer provides the verification code to the particular payment device prior to completion of the payment transaction; and
        transmitting, via a second signal from the cloud-based payment service to the particular payment device, payment transaction information including the verification code, wherein the verification code is used by the particular payment device to perform the payment transaction with the customer after the particular payment device verifies the customer on in response to a comparison of the verification code received by the particular payment device with the verification code provided by the customer during the payment transaction;
    receiving, from the particular payment device, an outcome of the payment transaction; and
    providing, to the mobile device, in response to receiving the outcome of the payment transaction from the particular payment device, an indication of the outcome of the payment transaction.

2. The computer-implemented method of claim 1, wherein the unique identifier that identifies the location of the mobile device of the customer comprises a unique identifier identifying a particular location within the entity, wherein the entity is associated with the plurality of payment devices.

3. The computer-implemented method of claim 2, wherein the unique identifier that identifies the location of the mobile device of the customer is embedded in a visually encoded image provided at the entity, wherein the visually encoded image is scanned by a camera of the mobile device of the customer.

4. The computer-implemented method of claim 3, wherein the visually encoded image comprises a quick response (QR) code, wherein the QR code embeds the unique identifier and one of the URL of the cloud-based payment service or a uniform resource identifier (URI) for a mobile application associated with the cloud-based payment service.

5. The computer-implemented method of claim 2, wherein the unique identifier that identifies the location of the mobile device of the customer is embedded in a wireless signal transmitted at the entity, wherein the wireless signal is captured by wireless capabilities of the mobile device.

6. The computer-implemented method of claim 5, wherein the wireless signal embeds the unique identifier and one of the URL of the cloud-based payment service or a uniform resource identifier (URI) for a mobile application associated with the cloud-based payment service.

7. The computer-implemented method of claim 1, further comprising, in response to determining, based on the unique identifier, the entity and the first location within the entity, performing a fraud verification operation to confirm that a current location of the mobile device of the customer corresponds to the first location within the entity.

8. The method of claim 7, wherein the fraud verification operation comprises:
    sending, by the cloud-based payment service and to the mobile device of the customer, a request for information identifying a current location of the mobile device of the customer;
    receiving, from the mobile device of the customer and by the cloud-based payment service, a response including an identified current location of the mobile device of the customer; and
    comparing the identified current location of the mobile device of the customer with the first location within the entity to determine whether the identified current location of the mobile device of the customer is within a threshold distance from the first location within the entity.

9. The method of claim 8, wherein, in response to the fraud verification operation determining that the identified current location of the mobile device of the customer is not within a threshold distance from the first location within the entity, rejecting the request to perform the payment transaction.

10. The method of claim 1, wherein each of the plurality of the payment devices at the entity comprise EMV chip, contactless, or swipe-based transactions.

11. The method of claim 1, wherein the unique identifier received from the mobile device of the customer identifies an existing transaction performed via a web-based ordering system, and wherein the payment transaction is to complete the existing transaction.

12. A non-transitory, computer-readable medium coupled to one or more processors and having instructions stored thereon which, when executed by the one or more processors, cause the one or more processors to perform operations, the operations comprising:
   obtaining, by one or more processors of a cloud-based payment service system and from a mobile device of a customer, a unique identifier that identifies a location of the mobile device within an entity and a request to perform a payment transaction at the entity, wherein a connection between the cloud-based payment service system and the mobile device is automatically initiated in response to the mobile device scanning a code comprising the unique identifier and a URL (Uniform Resource Locator) of the cloud-based payment service;
   determining, by the cloud-based payment service and based on the unique identifier, the entity and a first location within the entity;
   determining, by the cloud-based payment service and based on the first location within the entity, from a plurality of payment devices at the entity, a particular payment device at which the payment transaction is to be completed;
   in response to determining the particular payment device:
      generating a verification code for the payment transaction and the customer;
      transmitting, via a first signal from the cloud-based payment service to the mobile device of the customer, the verification code and an indication of the particular payment device at which the payment transaction is to be completed, wherein the customer provides the verification code to the particular payment device prior to completion of the payment transaction; and
      transmitting, via a second signal from the cloud-based payment service to the particular payment device, payment transaction information including the verification code, wherein the verification code is used by the particular payment device to perform the payment transaction with the customer after the particular payment device verifies the customer in response to a comparison of the verification code received by the particular payment device with the verification code provided by the customer during the payment transaction;
   receiving, from the particular payment device, an outcome of the payment transaction; and
   providing, to the mobile device, in response to receiving the outcome of the payment transaction from the particular payment device, an indication of the outcome of the payment transaction.

13. The computer-readable medium of claim 12, wherein the unique identifier that identifies the location of the mobile device of the customer comprises a unique identifier identifying a particular location within the entity, wherein the entity is associated with the plurality of payment devices.

14. The computer-readable medium of claim 12, wherein the unique identifier that identifies the location of the mobile device of the customer is embedded in a visually encoded image provided at the entity, wherein the visually encoded image is scanned by a camera of the mobile device of the customer, and wherein the visually encoded image comprises a quick response (QR) code, wherein the QR code embeds the unique identifier and one of the URL of the cloud-based payment service or a uniform resource identifier (URI) for a mobile application associated with the cloud-based payment service.

15. The computer-readable medium of claim 13, wherein the unique identifier that identifies the location of the mobile device of the customer is embedded in a wireless signal transmitted at the entity, wherein the wireless signal is captured by wireless capabilities of the mobile device, and wherein the wireless signal embeds the unique identifier and one of the URL of the cloud-based payment service or a uniform resource identifier (URI) for a mobile application associated with the cloud-based payment service.

16. The computer-readable medium of claim 12, further comprising, in response to determining, based on the unique identifier, the entity and the first location within the entity, performing a fraud verification operation to confirm that a current location of the mobile device of the customer corresponds to the first location within the entity, wherein the fraud verification operation comprises:
   sending, by the cloud-based payment service and to the mobile device of the customer, a request for information identifying a current location of the mobile device of the customer;
   receiving, from the mobile device of the customer and by the cloud-based payment service, a response including an identified current location of the mobile device of the customer; and
   comparing the identified current location of the mobile device of the customer with the first location within the entity to determine whether the identified current location of the mobile device of the customer is within a threshold distance from the first location within the entity.

17. The computer-readable medium of claim 16, wherein, in response to the fraud verification operation determining that the identified current location of the mobile device of the customer is not within a threshold distance from the first location within the entity, rejecting the request to perform the payment transaction.

18. The computer-readable medium of claim 12, wherein each of the plurality of the payment devices at the entity are capable to perform EMV chip, contactless, or swipe-based transactions.

19. A system comprising:
   one or more computers; and
   a computer-readable medium coupled to the one or more computers having instructions stored thereon which, when executed by the one or more computers, cause the one or more computers to perform operations comprising:
      obtaining, by one or more processors of a cloud-based payment service system and from a mobile device of a customer, a unique identifier that identifies a location of the mobile device within an entity and a request to perform a payment transaction at the entity, wherein a connection between the cloud-based payment service system and the mobile device is automatically initiated in response to the mobile device scanning a code comprising the unique identifier and a URL (Uniform Resource Locator) of the cloud-based payment service;

determining, by the cloud-based payment service and based on the unique identifier, the entity and a first location within the entity;

determining, by the cloud-based payment service and based on the first location within the entity, from a plurality of payment devices at the entity, a particular payment device at which the payment transaction is to be completed;

in response to determining the particular payment device:
  generating a verification code for the payment transaction and the customer;
  transmitting, via a first signal from the cloud-based payment service to the mobile device of the customer, the verification code and an indication of the particular payment device at which the payment transaction is to be completed, wherein the customer provides the verification code to the particular payment device prior to completion of the payment transaction; and
  transmitting, via a second signal from the cloud-based payment service to the particular payment device, payment transaction information including the verification code, wherein the verification code is used by the particular payment device to perform the payment transaction with the customer after the particular payment device verifies the customer in response to a comparison of the verification code received by the particular payment device with the verification code provided by the customer during the payment transaction;

receiving, from the particular payment device, an outcome of the payment transaction; and providing, to the mobile device, in response to receiving the outcome of the payment transaction from the particular payment device, an indication of the outcome of the payment transaction.

20. The system of claim 19, wherein the unique identifier that identifies the location of the mobile device of the customer is embedded in a visually encoded image provided at the entity, wherein the visually encoded image is scanned by a camera of the mobile device of the customer, and wherein the visually encoded image comprises a quick response (QR) code, wherein the QR code embeds the unique identifier and one of the URL of the cloud-based payment service or a uniform resource identifier (URI) for a mobile application associated with the cloud-based payment service.

* * * * *

UNITED STATES PATENT AND TRADEMARK OFFICE
CERTIFICATE OF CORRECTION

| | | |
|---|---|---|
| PATENT NO. | : 11,715,091 B2 | Page 1 of 1 |
| APPLICATION NO. | : 17/132781 | |
| DATED | : August 1, 2023 | |
| INVENTOR(S) | : Harry Tu | |

It is certified that error appears in the above-identified patent and that said Letters Patent is hereby corrected as shown below:

In the Claims

Column 24, Line 5, Claim 1, please replace "customer on" with -- customer --.

Signed and Sealed this
Twelfth Day of September, 2023

*Katherine Kelly Vidal*

Katherine Kelly Vidal
*Director of the United States Patent and Trademark Office*